United States Patent [19]

Croopnick et al.

[11] 4,246,108
[45] Jan. 20, 1981

[54] MICROSTRAINER APPARATUS AND METHOD

[75] Inventors: Gerald A. Croopnick, Trabuco Canyon; Irwin W. Sauer, Santa Ana, both of Calif.

[73] Assignee: Dresser Industries, Inc., Dallas, Tex.

[21] Appl. No.: 86,908

[22] Filed: Oct. 22, 1979

Related U.S. Application Data

[63] Continuation of Ser. No. 904,057, May 8, 1979, abandoned.

[51] Int. Cl.³ .............................................. B01D 33/06
[52] U.S. Cl. .................................... 209/291; 210/297; 210/330; 210/365; 210/369; 210/781; 210/806
[58] Field of Search ..................... 209/291; 210/66, 67, 210/78, 330, 297, 73 R, 326, 342, 360 A, 365, 369, 402, 404

[56] References Cited

U.S. PATENT DOCUMENTS

| 1,262,146 | 4/1918 | Ward | 210/360 A |
|---|---|---|---|
| 2,651,416 | 9/1953 | Van Der Mark et al. | 210/369 |
| 2,733,856 | 2/1956 | McCoy | 210/360 A |
| 2,750,107 | 6/1956 | More | 210/360 A |
| 3,190,449 | 6/1965 | Muller | 210/173 |
| 3,400,074 | 9/1968 | Grenci | 210/360 R |
| 3,583,567 | 6/1971 | Maestrelli | 210/330 |
| 3,655,058 | 4/1972 | Novak | 210/360 A |
| 3,879,286 | 4/1975 | Berriman | 210/345 X |
| 4,119,534 | 10/1978 | Porter et al. | 209/291 |

*Primary Examiner*—Charles N. Hart
*Assistant Examiner*—Richard W. Burks
*Attorney, Agent, or Firm*—Fred A. Winans; Robert W. Mayer

[57] ABSTRACT

A centrifugal microstrainer includes a closed cylindrical vessel with a cylindrical screen within, both rotating about a hollow shaft forming a common central axis. Liquid-solid admixture introduced through the shaft is flowed radially outward subjected to centrifugal acceleration, and forced back through the screen under pressure with particles too large to pass the screen remaining on its outboard side. The centrifugal force applied by the rotation of the vessel acts on these larger particles pushing them away from the screen thus preventing clogging and permitting substantially continuous operation. The device may be operated as a classifier by providing a plurality of concentric screens of decreasing mesh size spaced outwardly from one another in conjunction with properly sized chokes.

4 Claims, 3 Drawing Figures

MICROSTRAINER APPARATUS AND METHOD

RELATED APPLICATIONS

This is a continuation of application Ser. No. 904,057, filed May 8, 1979, now abandoned.

BACKGROUND OF THE INVENTION

This invention relates to straining and filtration apparatus and methods and more particularly to a microstraining apparatus and method wherein centrifugal force is applied to a liquid-solid admixture being filtered in order to prevent clogging of the screen through which filtration takes place.

In conventional microstraining apparatus wherein a liquid containing a suspension of finely divided solids is forced through a foraminous filter medium such as a screen, the problem has always arisen of clogging of the screen by accumulation of solid particles too large to pass through the screen. A cake builds up on the screen which completely blocks the openings therein and ultimately prevents passage of either liquid or suspended solids normally small enough to pass through. In addition to requiring time-consuming shut-downs of equipment for screen cleaning, this makes it particularly difficult to use filtration or straining ot classify or separate suspended particles within different size ranges.

DESCRIPTION OF THE PRIOR ART

U.S. Pat. No. 3,400,074 to Grenci issued Sept. 3, 1968, discloses an apparatus and process for desalination wherein salt water is introduced inside a rotating cylindrical semi-permeable membrane so that pure water passes through the membrane under centrifugal force. According to this patent, reverse osmosis is accomplished by using centrifugal force to elevate the solvent-solute admixture to a pressure above its osmotic pressure and the centrifugal force acting upon the admixture drives at least a part of the solvent through the osmotic membrane. This enables substantial pure solvent to be collected on the one side of the membrane. The patent also suggests that further purfication of the component or components which pass through the semi-permeable membrane may be accomplished by providing a plurality of membranes in one centrifugal device.

U.S. Pat. No. 3,879,286 to Berriman, issued Apr. 22, 1974, discloses filtering apparatus including a rotatably mounted frame and a screen mounted on the frame and extending in a largely radial direction from the axis of rotation of the frame. A feed conduit feeds fluid with suspended particles therein along one face of the screen while the frame is rotated at high speed. Thus a large centrifugal force is applied to the fluid and the particles therein as it moves across the screen. The centrifugal force urges the particles to settle out of the fluid in a radially outward direction so that there is a reduced build-up of large particles on the screen that would tend to block it.

SUMMARY OF THE INVENTION

In accordance with this invention, microstraining apparatus is provided wherein liquid-solid admixture is pumped in through a central shaft and flowed out radially in such a fashion as to bring all the fluid to the desired centrifugal acceleration before it is exposed to a screen. The screen is of generally cylindrical shape and is positioned within a rotating vessel. Centrifugal force is developed by the rotation of the vessel in a direction opposite to the direction of flow of the admixture into the screen. This has the effect of pushing off particles that are too large to pass through the screen and preventing a build-up of solids on the screen. In one embodiment of the invention, a plurality of concentrically mounted cylindrical screens are provided with screens of progressively finer mesh located toward the outer periphery of the rotating chamber. This has the effect of providing a plurality of annular separation chambers from which particles of a specified size range may be withdrawn.

DETAILED DESCRIPTION OF THE DRAWINGS

Figure 1:
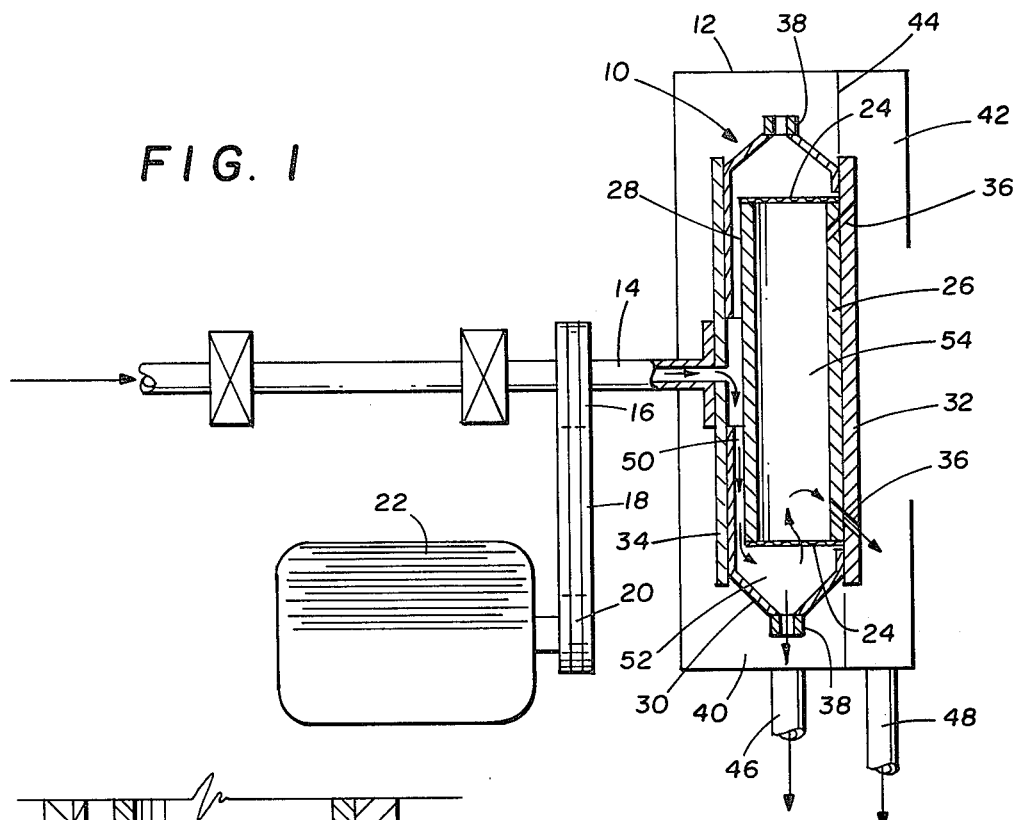
FIG. 1 is a view showing the microstraining device of the invention in cross-section.

FIG. 1 illustrates diagrammaticaly a microstrainer system including a rotating vessel generally indicated at 10 positioned within a stationary shroud 12 and mounted on a hollow rotatable shaft 14. Shaft 14 is shown as carrying a pulley 16 driven by a belt 18 which is powered in turn from pulley 20 by motor 22. Mounted inside of vessel 10 and rotating therewith is a generally cylindrical screen 24 secured to plates 26 and 28. The vessel is further defined by outer walls 30 and end plates 32 and 34. End plate 32 is provided with a series of angularly-spaced passages 36. Formed in the outer walls 30 around the circumference of vessel 10 are a series of angularly-spaced chokes 38 which, as will be more fully explained subsequently, are adapted to discharge concentrate into concentrate chamber 40 which is defined by the exterior of the vessel 10 and the shroud 12. Passages 36 are similarly arranged to discharge effluent into effluent chamber 42 which is separated from concentrate chamber 40 by flow diverter 44. From these respective chambers concentrate is withdrawn through passage 46 and effluent through passage 48.

In operation of the present invention, liquid-solid admixture is fed through hollow shaft 14 into the interior of vessel 10 and passes through space 50 where the centrifugal forces are transferred to the fluid into an annular separation chamber 52 which is located on the outboard side of cylindrical screen 24. Pressure from a pump (not shown) causes the liquid-solid admixture to fill separtion chamber 52 thus forcing liquid through screen 24 into central chamber 54. Rotation of the vessel 10 about its central axis which is an extension of shaft 14 exerts centrifugal force upon the particles contained in the liquid-solid admixture in a direction away from the central axis of vessel 10 and toward its outer edge.

Figure 2:
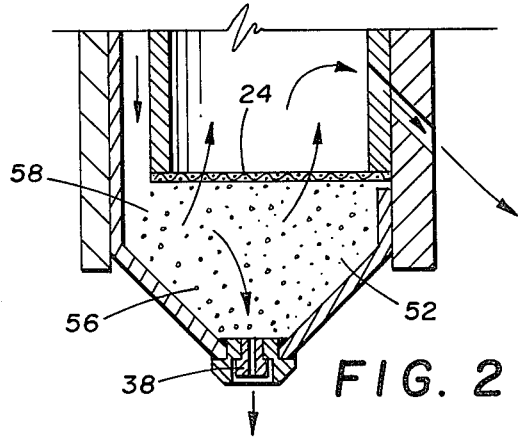
FIG. 2 is an enlarged partial cross-sectional view of the apparatus shown in FIG. 1 illustrating diagrammatically the disposition of various sized solid particles dispersed in the liquid-solid admixture undergoing microstraining.

As indicated by the arrows in FIG. 2, larger particles designated as 56 are pushed by the centrifugal force toward the outer portion of separation chamber 52 while the smaller particles 58 are carried by the influence of fluid drag toward the inner portion of the chamber and screen 24. The influence of the centrifugal force upon these smaller particles 58 is sufficient, however, to prevent those too large to pass through the screen 24 from accumulating on the outboard surface thereof and blocking the openings therein. This is because as soon as a particle lodges within the hole on the screen, the fluid drag force ceases and the centrifugal force acting in the opposite direction dislodges it. The present invention thus provides a microstraining apparatus with a continuously self-cleaning screen. In practice it has been found that apparatus of the type illustrated in FIGS. 1 and 2 can be used to strain liquid-solid admixtures for an indefinite period of time without the necessity of shutdown for screen cleaining.

Figure 3:
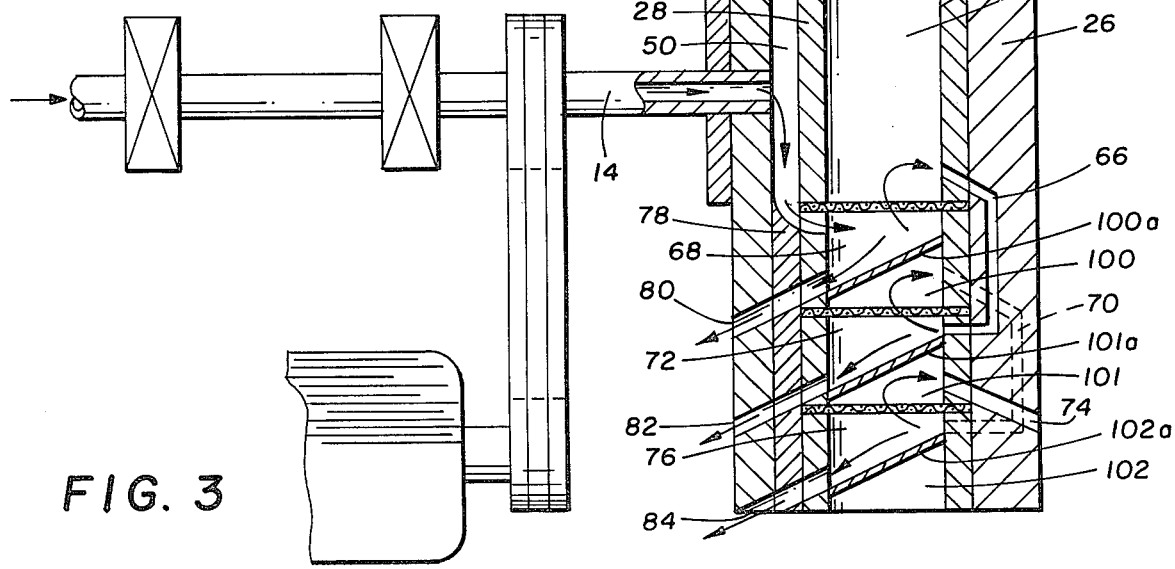
FIG. 3 is an enlarged partial cross-sectional view showing another embodiment of the invention wherein a plurality of separation chambers are provided.

FIG. 3 illustrates another embodiment of the invention wherein three separation chambers are provided in series. This apparatus may be used to classify solids into desired particle size ranges by proper selection of the screen sizes, speed of rotation and choke size.

In this embodiment, the rotating vessel 9 is provided with three concentrically positioned substantially cylindrical screens 60, 62, and 64 with screen 60 being the coarsest in mesh size, screen 64 the finest and screen 62 of intermediate mesh size. The annular spaces between the concenric screens are divided into separation chambers 68, 72, and 76, and effluent chambers 54, 100 and 101 by conical walls 100A, 101A and 102A, which form the outer walls of the separation chambers. The plate 26 and the end plate 32 have a series of liquid admixture-conveying passages formed in them with passage 66 connecting effluent chamber 54 with separation chamber 72, passage 70 connecting effluent chamber 100 with separation chamber 76, and passage 74 discharges effluent containing solids smaller than the finest screen mesh.

Plate 28, spacer 78 and end plate 34 are formed with chokes 80, 82, and 84 for carrying liquid-solid admixture respectively from separation chambers 68, 72, and 76. These chokes are of progressively smaller diameter with choke 80 being the largest diameter, choke 84 the smallest, and choke 82 of intermediate diameter.

In operation of the FIG. 3 embodiment, liquid-solid admixture is pumped through hollow shaft 14 into the radial passage 50 which carries it into inner separation chamber 68. The liquid and solid material fine enough to pass through screen 60, flows into effluent chamber 54 and by the combined influenc of centrifugal force provided by rotation of the vessel 10 and the pumping force supplied on the feed is flowed through passage 66 gaining centrifugal force, into intermediate separation chamber 72. Meanwhile, the solid particles too large to pass through screen 60 are pushed by centrifugal force toward the periphery of vessel 10 and are guided by canted wall 100A to choke 80 as a discharge which now contains solid particles predominatly larger than the mesh size of screen 60.

The treated effluent in intermediate separation chamber undergoes a similar separation process with the liquid and particles small enough to pass through screen 62 flowing into effluent chamber 100 and being forced by centrifugal force through the passage 70 (again gaining centrifugal force) which carries it to separation chamber 76. Meanwhile, a concentrate is formed within intermediate separation chamber 72 of suspended particles too large to pass through screen 62. This is flowed along wall 101A through the choke 82 and discharged.

Similarly admixture in outer separation chamber 76 is strained through screen 64 with concentrate containing the smallest size solid particles being discharge through choke 84 and effluent being discharge through passage 74. The outer chamber 102 is, in effect, a blank since no liquid-solid admixture reaches it.

As with the embodiments illustrates in FIGS. 1 and 2, the application of centrifugal force to the multi-stage centrifugal microstrainer classifer provides a separation force for suspended solids and a cleaning action for the screens so that clogging does not take place and device may be run of an indefinite period without the necessity for shutting down to clean the screens.

The embodiments of the invention in which an exclusive property or privilege is claimed are defined as follows:

1. Apparatus for fractionally separating finely divided solids from liquid comprising:
    (a) a closed rotatable vessel of generally cylindrical shape having a central axis;
    (b) at least two screens of generally cylindrical shape fixed within said vessel concentrically of each other for rotation along with the vessel, wall means outboard of each screen so that said screens and said wall means define annular separation chambers outboard of each screen, the screens having progressively smaller meshes extending away from axis;
    (c) a hollow shaft co-axial with said vessel for introducing a mixture of liquid and finely divided solids to be processed into said vessel under pressure inboard of said screens;
    (d) first passage means within said vessel connecting said hollow shaft and the separation chamber outboard of the innermost screen;
    (e) second passage means connecting the inboard side of the innermost screen with the separator chamber of the next succeeding screen;
    (f) means for rotating said vessel and screens about said axis; and
    (g) separate discharge means in the vessel for each separation chamber and the inboard side of the outermost screen.

2. Apparatus according to claim 1 wherein the discharge means includes choke means for withdrawing solids from said separation chambers.

3. Apparatus according to claim 1 wherein each of said annualr spaces is divided into an effluent chamber and a separation chamber.

4. A method for fractional separation of finely divided solids from a liquid, comprising the steps:
    (a) introducing a liquid-solid mixture to the outboard side of a first cylindrical rotating screen fixed in a rotating housing;
    (b) discharging particles too large to pass through the first screen;
    transmitting the remaining mixture which passes through the first screen to the outboard side of a second cylindrical rotating screen which has a finer mesh, is larger in diameter and concentric with the first screen and fixed in the housing; and
    (d) discharging particles too large to pass through the second screen and the mixture which passes through the second screen.

* * * * *